United States Patent [19]

Rachels et al.

[11] Patent Number: 4,865,169
[45] Date of Patent: Sep. 12, 1989

[54] DEVICE FOR CONTROLLING THE RATE OF MOVEMENT OF A PISTON ROD RELATIVE TO A CYLINDER

[75] Inventors: Lem Rachels, 1725 E. Dixon Blvd., Shelby, N.C. 28150; Kenneth Bush, Kings Mountain, N.C.

[73] Assignee: Lem Rachels, Shelby, N.C.

[21] Appl. No.: 208,662

[22] Filed: Jun. 20, 1988

[51] Int. Cl.⁴ ............................ F16F 9/32; F16F 5/00; A44B 21/00

[52] U.S. Cl. ........................................ 188/300; 24/569; 267/64.12

[58] Field of Search ............... 188/67, 300; 267/64.12, 267/120, 124; 296/56, 76; 403/344, 313; 24/569, 535; 16/52, 66, 84, 85, DIG. 9, DIG. 17

[56] References Cited

U.S. PATENT DOCUMENTS

| 1,055,030 | 3/1913 | Gibbs | 16/66 |
| 1,062,575 | 5/1913 | Gibbs | 16/66 |
| 1,115,539 | 11/1914 | Hoferle | 16/66 |
| 3,566,435 | 2/1971 | Nakamura | 16/66 |
| 3,579,708 | 5/1971 | Lee | 16/66 |
| 4,217,061 | 8/1980 | Eiland et al. | 403/344 X |
| 4,309,027 | 1/1982 | Molders et al. | 267/124 |
| 4,415,194 | 11/1983 | Bauer | 296/76 |
| 4,507,105 | 3/1985 | Stottmann et al. | 403/344 X |
| 4,634,170 | 1/1987 | Lach | 296/76 |

FOREIGN PATENT DOCUMENTS

| D012819 | 3/1956 | Fed. Rep. of Germany | 24/569 |
| 1094105 | 6/1964 | United Kingdom | 403/313 |
| 2139282 | 11/1984 | United Kingdom | 267/64.12 |

Primary Examiner—Robert J. Oberleitner
Attorney, Agent, or Firm—Laurence R. Brown; Alfred J. Mangels

[57] ABSTRACT

A clamping device for use with a gas spring in the form of a cylinder containing a gas, and a piston and piston rod movable within the cylinder. The clamping device is secured to the end of the cylinder through which the piston rod passes, and includes a clamping portion that engages and clamps around the piston rod to provide resistance to movement of the piston rod relative to the cylinder. The clamping device is a U-shaped structure having clamping legs that can be moved toward each other by a bolt and nut arrangement. The clamping device can be made from an injection molded plastic material, and the device permits continued use of the gas spring after the gas pressure has diminished to a level at which replacement of the spring would otherwise be required.

20 Claims, 1 Drawing Sheet

DEVICE FOR CONTROLLING THE RATE OF MOVEMENT OF A PISTON ROD RELATIVE TO A CYLINDER

BACKGROUND OF THE INVENTION

1. Field of the Invention

This invention relates to gas springs, and more particularly to a safety clamp device for attachment to a gas spring in order to provide additional resistance to movement of the piston rod relative to the cylinder to compensate for loss of gas pressure that would casue the spring to lose its effectiveness.

2. Description of the Related Art

Gas springs generally include a closed end cylinder containing gas under pressure, a piston movable within the cylinder and against which the gas pressure acts, and a piston rod connected to the piston and extending outwardly from the cylinder at the end opposite from the closed end. Such gas springs are used in a number of applications to serve as a counterbalancing device to counterbalance the weight of a movable member to permit the movable member to be held in a particular position relative to a stationary member. For example, gas springs are often used on automobiles to serve as counterbalancing devices for trunk lids or hatch covers, particularly on so-called hatchback models. The closed cylinder ends of the gas spring is pivotably attached to either a part of the frame surrounding the trunk or hatch opening or to a part of the trunk lid or hatch, and the free end of the piston rod is pivotably attached to the other part. When the lid or hatch is closed the piston rod is retracted into the cylinder, and causes an increase in the pressure of the gas, thereby tending to urge the lid or hatch into an open condition. When the lid or hatch is unlatched, the gas pressure in the gas spring aids in overcoming the weight of the lid or hatch and makes it easier to open. When the lid or hatch is fully opened, the gas and the cylinder is at a sufficient pressure to hold it in an opened condition, yet is not so high as to result in excessive resistance when it is desired that the lid or hatch be closed.

Under certain conditions, the effectiveness of such a gas spring is reduced to the point that it becomes more difficult to lift the hatch from a closed to an open position, and the hatch no longer remains in the fully opened position. That condition results from wear that takes place in the gas spring over a period of time as a result of frequent usage, which permits the gas in the spring to slowly escape, thereby reducing the gas pressure and the effectiveness of the spring. Another condition that could cause excesive force to be required to open a hatch occurs when the temperature of the gas in the spring falls to a low level, with a corresponding reduction of the gas pressure, for example in cold climates.

When the pressure in the gas spring has fallen to such a level that the effectiveness of the spring is reduced to the point that it no longer is able to hold the hatch in an opened condition, the normal reaction of a user is to discard the entire spring and to obtain and install a new one. However, such springs are relatively expensive devices, and it is therefore desirable to attempt to find an alternative solution that would not require the purchase of a new spring.

One way in which a worn gas spring can continue to be used so that it can maintain a lid in an open condition is by means of a stop device, such as that shown in U.S. Pat. No. 3,566,435, which issued Mar. 2, 1971, to Kazuo Nakamura. The stop device disclosed in that patent is a coil spring member that is loosely carried on and slides along the piston rod, and that includes a leg that extends from the coiled portion of the structure to contact the end wall of the cylinder adjacent to the point at which the piston rod passes through the cylinder end wall. The stop device hold the piston rod securely relative to the cylinder by means of a torque that is applied by the leg to the coiled portion, which then rests against the grips the rod. However, that device is inconvenient to use because it requires additional manipulation to set it in position each time the hatch is opened and to release it each time the hatch is closed. Furthermore, because the device is loosely carried on the rod when the piston rod is retracted into the cylinder it can cause undesirable rattling noise if applied to an automobile hatch spring when the automobile travels over bumpy road surfaces.

Another solution to maintaining a hatch cover in an opened condition is disclosed n U.S. Pat. No. 4,634,170, which issued Jan. 6, 1987, to John S. Lach. That patent discloses a device that is intended to be placed between the end of the cylinder through which the piston rod passes and the point to which the free end of the piston rod is attached to the lid structure. Basically, that device serves as a block or bar to prevent the weight of the hatch lid from pushing the piston rod into the cylinder of a worn gas spring. That device is inconvenient to use because it must be separately carried in the vehicle and then placed in position and subsequently removed from position. Because it is a separate part it is possible that it could easily be lost or misplaced and therefore unavailable when needed.

It is therefore an object of the present invention to overcome the shortcomings in the existing arrangements described above, and to provide a self-contained safety clamp that is carried on a gas spring to permit the piston rod to be conveniently maintained at any position relative to the cylinder. Summary of the Invention Briefly stated, in accordance with one aspect of the present invention, a safety clamp is provided for a gas spring in order to control the position of a piston rod relative to a gas cylinder. The clamp includes attaching means for attaching the clamp to a fluid-containing cylinder that carries a longitudinally movable piston and piston rod. The clamp also includes rod clamping means connected with the attaching means for clamping and frictionally engaging the surface of the piston rod in order to selectively control the rate of longitudinal movement of the piston rod relative to the cylinder.

DESCRIPTION OF THE PREFERRED EMBODIMENTS

Figure 1:
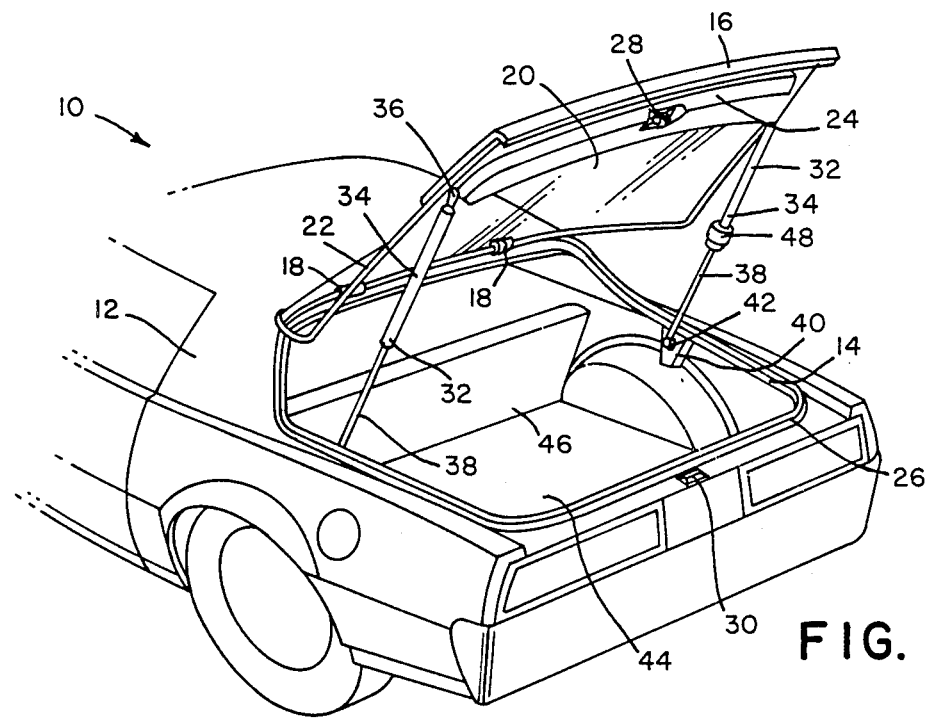
FIG. 1 is a fragmentary perspective view showing the rear portion of an automobile having a rear hatch cover lid that includes a pair of gas springs, one of which includes a safety clamp in accordance with the present invention.
Figure 3:
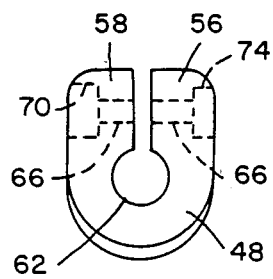
FIG. 3 is a end view showing the left-hand end of the clamp illustrated in FIG. 2.
Figure 2:
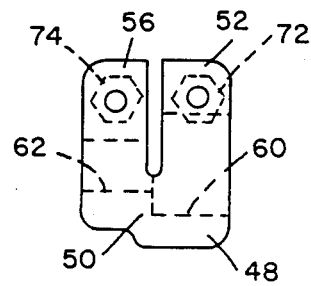
FIG. 2 is a side view of the safety clamp illustrated in FIG. 1.
Figure 4:
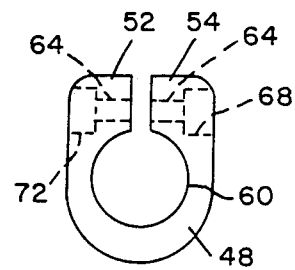
FIG. 4 is an end view showing the right-hand end of the clamp illustrated in FIG. 2.

Referring now to the drawing, and particularly to FIG. 1 thereof, there is shown the rear portion of an automobile 10 that includes a body 12 that defines a rear hatch opening 14. A rear hatch cover lid 16 is hingedly connected with body 12 by means of a pair of spaced hinges 18 to permit the cover lid to be pivotably moved from the open position illustrated in FIG. 1 to a closed position in which cover lid 16 covers and closes rear hatch opening 14.

Cover lid 16 as shown in FIG. 1 is in the form of a glass panel 20, and includes a metal peripheral frame 22, and a metal crosspiece 24. Metal frame 22 is adapted to sealingly engage with a reislient gasket material 26 of known type that is positioned around the periphery of rear hatch opening 14. Crosspiece 24 includes a hook 28, or the like, that is engageable with catch 30, or the like, secured to body 12. Although a particular type of glass hatch cover is illustrated and described, it will be apparent to those skilled in the art that many other forms of hatch or lid or door structures can also be used, and the hatch structure disclosed herein is for purposes of illustration only.

As shown in FIG. 1, a pair of gas springs 32 are provided, one at each lateral side of cover lid 16. Springs 32 each include a tubular cylinder 34 that has one closed end that is pivotally connected with the cover lid crosspiece 24 by means of a pin-type hinge 36, or the like. Extending from each of cylinders 34 is a piston rod 38, the outermost end of which is pivotally connected with body 12 at a frame member 40 by means of a pin hinge 42, or the like.

Cover lid 16 as shown in FIG. 1 is in the open position, to provide access to storage area 44 behind rear seat 46 of the automobile. The pressure of the gas within cylinders 32 is sufficient to maintain cover lid 16 in the open condition, and in order to close the lid it is only necessary to manually pull the lid downwardly to overcome the gas pressure and thereby permit hook 28 to engage with catch 30, to thereby maintain the lid in a closed condition. Again, although shown in FIG. 1 as having a pair of gas springs, only a single such spring can be used, as desired, and the showing of a pair of springs is for illustrative purposes only.

One of gas springs 32 shown in FIG. 1 includes a safety clamp 48 in accordance with the present invention. As best seen in FIGS. 2 through 5, clamp 48 includes a body 50 that is a unitary structure and is generally U-shaped as viewed from the sides of from the ends, and that includes two pairs of opposed legs 52, 54 and 56, 58. Clamp 48 includes a cylinder-receiving bore 60 at one end thereof, between legs 52 and 54, and a rod-receiving bore 62 at the other end thereof, between legs 56 and 58. Cylinder-receiving bore 60 and rod-receiving bore 62 are coaxial.

The respective pairs of opposed legs 52,54 and 56,58 are substantially parallel and are connected to the body 50 along the axis of the respective bores so that each pair is capable of functioning independently of the other. Similarly, legs 52 and 54 are also substantially parallel with and spaced from each other, as are legs 56 and 58. The legs are similarly configured and each pair of legs 52, 54 and 56, 58 includes a through bore 64, 66, respectively, to receive a bolt that passes through each of the opposed legs. Legs 54 and 58 each include a counterbore 68, 70, respectively, to receive the head of an attaching bolt, and legs 52 and 56 each include a hexagonal recess 72, 74, respectively, to non-rotatably receive a nut that is engageable with the bolt.

Figure 5:
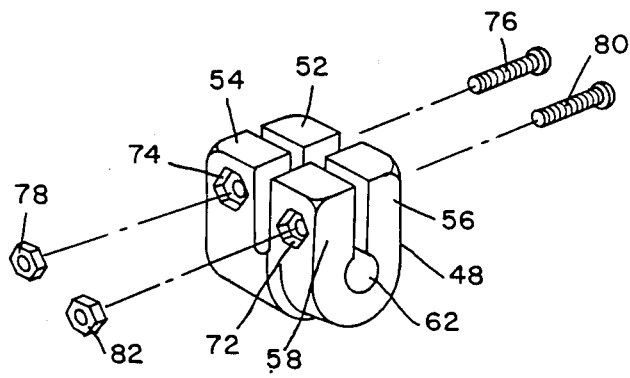
FIG. 5 is a perspective view showing the clamp illustrated in FIGS. 2 through 4, and showing in exploded form the bolts and nuts used to effect the attachment of the device as well as to effect a clamping force on the piston rod.

As best seen in FIG. 5, legs 52 and 54 that extend outwardly from cylinder-receiving bore 60 can be clamped around a cylinder by a first bolt 76 and nut 78, and legs 56 and 58 extending outwardly from rod-receiving bore 62 bore can be clamped around a rod by means of a second bolt 80 and nut 82.

Figure 6:
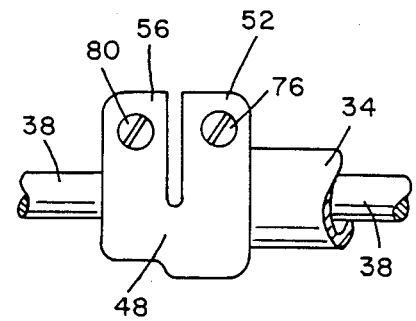
FIG. 6 is a fragmentary side view showing the clamp of FIGS. 2 through 5 attached to the cylinder and piston rod of a gas spring.

Referring to FIG. 6, the safety clamp 48 in accordance with the present invention is shown in its operative position on a gas spring attached to cylinder 34. Legs 52 and 54 (the latter of which is not shown) clampingly engage the end of cylinder 34, and bolt 76 is turned to move legs 52 and 54 together to firmly clamp against the end of the cylinder so that safety clamp 48 is secured thereto. Legs 56 and 58 (the latter of which is not shown) clamp against and surround a major portion of the transverse outer surface of piston rod 38, and bolt 80 is turned to move legs 56 and 58 together to provide the necessary frictional resistance between safety clamp 48 and rod 38 in order to retain rod 38 in a desired position. Thus the frictional force between the safety clamp and the piston rod is a function both of the clamping force applied to rod 38 by legs 56 and 58, as well as of the axial length of the contact area between the legs and the piston rod.

Thus, when the gas spring is new, and the gas pressure is high, a loose connection can be maintained between the safety clamp and the piston rod to permit the gas spring to function in its normal manner. As wear of the gas spring occurs and as the gas pressure within the spring falls from its original value, the legs surrounding the piston rod can be brought closer together to increase the frictional froce between the safety clamp and the piston rod to overcome the effect of the reduction of gas pressure within the cylinder. As the gas pressure further diminishes, as a result of additional wear of the parts of the gas spring, the rod clamping portion can be further tightened so that it will continue to provide resistance to safely hold the cover lid in an open position and to keep it from falling closed when it has been opened.

Although the safety clamp in accordance with the present invention also increases the frictional drag acting on the piston rod as the cover lid is opened, because the weight of the cover lids in modern automobiles is kept to a relatively low level, the weight of the cover lid plus the frictional drag imposed by the safety clamp do not result in an excessive force required to open the cover lid.

The safety clamp can be made of any particular material that is sufficient to provide the desired degree of frictional drag when the device is clamped around a piston rod. Preferably, for convenience of manufacture and for low cost, the safety clamp is made from an injection moldable plastic material. A suitable material is Nylon ST-801 that can contain approximately 15% glass. However, other moldable materials can also be used, if desired.

Although the dimensions of the safety clamp will be dependent upon the size of the cylinder and piston rod with which it is intended to be used, preferably bores 60 and 62 have substantially the same axial length and the peripheral contact between the rod-receiving bore of the safely clamp and the piston rod itself is approximately 92% of the circumference of the piston rod. Further, for a piston rod having a diameter of about 0.330 inches, an axial length of the rod bore that has been found to be effective is 9/16 inch.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the present invention.

What is claimed is:

1. A unitary safety clamp for controlling the relative movement of a longitudinally movable piston rod relative to a fluid-containing cylinder, said clamp comprising:
    (a) unitary body means adapted to partially surround and engage the cylinder and the piston rod;
    (b) attaching means integral with the body means for securing the clamp to the fluid-containing cylinder that includes the longitudinally movable piston rod, wherein the attaching means is a U-shaped member having a single pair of legs extending laterally outwardly in the same direction from the body means; and
    (c) rod clamping means integral with the body means for clampingly and frictionally engaging the surface of the piston rod to permit relative axial movement between the piston rod and the cylinder, the rod clamping means including adjusting means to selectively control the rate of axial movement of the piston rod relative to the cylinder to permit a rod clamping force to be changed.

2. A clamp in accordance with claim 1, wherein the attaching means includes a cylinder clamp for engagement with the outer surface of the cylinder.

3. A clamp in accordance with claim 2, wherein the cylinder clamp engages the cylinder at an end of the cylinder from which the piston rod extends.

4. A clamp in accordance with claim 3, including connecting bolt means carried by the legs for selectively urging the legs together to clampingly engage the cylinder.

5. A clamp in accordance with claim 1, wherein the rod clamping means surrounds a major portion of the transverse outer surface of the piston rod.

6. A clamp in accordance with claim 1, wherein the rod clamping means is a U-shaped clamping member having a curved base portion in contact with the piston rod and having a single pair of spaced, rod clamping legs extending outwardly in the same direction from the body means to contact the piston rod.

7. A clamp in accordance with claim 6, wherein the legs extend transversely outwardly beyond the piston rod, and the adjusting means includes adjustable connecting means connecting and extending between the legs to permit a change in the clamping force of the rod clamping means acting on the rod.

8. A clamp in accordance with claim 7, wherein the adjusting means includes connecting bolt means extending between the contacting the rod clamping legs to permit the clamping legs to be moved toward each other.

9. A clamp in accordance with claim 6, wherein the attaching means include a cylinder clamp for engaging the outer surface of the cylinder.

10. A clamp in accordance with claim 9, wherein the cylinder clamp and the rod clamping means have respective bores that are concentric with each other.

11. A clamp in accordance with claim 10, wherein the cylinder clamp is a U-shaped member having a pair of legs extending laterally outwardly from the cylinder, and connecting bolt means are carried by the legs for selectively urging the legs together to clampingly engage the cylinder.

12. A clamp in accordance with claim 10 wherein the legs of the clamp and the rod clamping legs extend in the same direction relative to the bore axis.

13. A unitary clamping device for controlling the movement of a piston rod relative to a fluid-containing cylinder, said device comprising:
    (a) unitary body means adapted to partially surround and engage the cylinder and the piston rod;
    (b) first clamping means integral with the body means for clamping engagement of the device with the outer surface of the cylinder, the first clamping means including a U-shaped member having a single pair of legs extending laterally outwardly in the same direction from the body means; and
    (c) second clamping means integral with the body means for adjustable clamping engagement with the outer surface of a piston rod extending axially outwardly from the fluid-containing cylinder, the second clamping means permitting adjustable frictional engagement with the piston rod for controlling the rate of relative axial movement of the piston rod relative to the cylinder, the first and second clamping means each being an integral part of and extending from the body means that substantially surrounds both the cylinder and the poston rod.

14. A clamping device in accordance with claim 13, wherein the first clamping means is defined by a first U-shaped clamp and the second clamping means is defined by a second U-shaped clamp.

15. A clamping device in accordance with claim 14, wherein the first and second U-shaped clamps are integral with each other and define a unitary structure.

16. A clamping device in accordance with claim 15, wherein the clamping device is made from a molded plastic material.

17. A clamping device in accordance with claim 16, wherein the plastic material is nylon.

18. A clamping device in accordance with claim 15, wherein the first clamping means includes a first circular bore engageable with the cylinder and the second clamping means includes a second circular bore engageable with a major portion of the transverse periphery of the piston rod.

19. A clamping device in accordance with claim 18, wherein the second clamping means engages substantially 92% of the transverse circumference of the piston rod.

20. A clamping device in accordance with claim 18, wherein the first and second circular bores have substantially the same axial length.

* * * * *